US011427281B2

(12) United States Patent
Ishikawa

(10) Patent No.: US 11,427,281 B2
(45) Date of Patent: Aug. 30, 2022

(54) HUMAN-POWERED VEHICLE COMPONENT

(71) Applicant: Shimano Inc., Osaka (JP)

(72) Inventor: Yuichiro Ishikawa, Osaka (JP)

(73) Assignee: Shimano Inc., Osaka (JP)

( * ) Notice: Subject to any disclaimer, the term of this patent is extended or adjusted under 35 U.S.C. 154(b) by 379 days.

(21) Appl. No.: 16/362,756

(22) Filed: Mar. 25, 2019

(65) Prior Publication Data

US 2019/0300102 A1  Oct. 3, 2019

(30) Foreign Application Priority Data

Mar. 29, 2018 (JP) .............................. JP2018-065722

(51) Int. Cl.
*B60L 53/60* (2019.01)
*B62M 6/45* (2010.01)
*B62M 6/90* (2010.01)

(52) U.S. Cl.
CPC .............. *B62M 6/45* (2013.01); *B60L 53/60* (2019.02); *B62M 6/90* (2013.01); *B60L 2200/12* (2013.01)

(58) Field of Classification Search
CPC . B62M 6/45; B62M 6/90; B60L 53/60; B60L 2200/12; B60L 53/62; B60L 58/12; B60L 53/66; B60L 58/10; B60L 50/60; B60L 50/20; B60L 58/21; Y02T 90/12; Y02T 10/7072; Y02T 10/70; Y02T 90/16
See application file for complete search history.

(56) References Cited

U.S. PATENT DOCUMENTS

| | | | | |
|---|---|---|---|---|
| 9,682,743 B2* | 6/2017 | Miyoshi | ................... | B62J 99/00 |
| 10,773,769 B2* | 9/2020 | Takeshita | ................ | B62M 6/90 |
| 2010/0228405 A1* | 9/2010 | Morgal | .................... | B60L 53/68 |
| | | | | 701/2 |
| 2016/0087314 A1* | 3/2016 | Arashima | ................ | B62M 6/90 |
| | | | | 320/134 |
| 2016/0311500 A1* | 10/2016 | Kasai | ....................... | B62J 43/30 |
| 2016/0339986 A1* | 11/2016 | Jordan | ................... | B62K 23/02 |

(Continued)

FOREIGN PATENT DOCUMENTS

| | | |
|---|---|---|
| CN | 105564554 A | 5/2016 |
| JP | 2012-96614 A | 5/2012 |

(Continued)

*Primary Examiner* — Donald J Wallace
*Assistant Examiner* — Daniel M. Robert
(74) *Attorney, Agent, or Firm* — Global IP Counselors, LLP

(57) ABSTRACT

A human-powered vehicle component includes a communication device and an electronic controller. The communication device is configured to communicate with a first electric component and a second electric component differing in type from the first electric component. The electronic controller is configured to be operable in a first control state to manage the first electric component and a second control state managed by the second electric component. The electronic controller is configured to be operable in the first control state upon determining the communication device can communicate with the first electric component but cannot communicate with the second electric component. The electronic controller is configured to be operable in the second control state upon determining the communication device can communicate with the second electric component.

20 Claims, 6 Drawing Sheets

(56) References Cited

U.S. PATENT DOCUMENTS

2018/0319457 A1\* 11/2018 Santucci ................. B62M 6/50
2019/0202525 A1\* 7/2019 Shahana ................. B60L 15/20
2020/0180728 A1\* 6/2020 Ohashi .................... B62M 6/45

FOREIGN PATENT DOCUMENTS

JP          2014144699 A  *  8/2014
JP             6157536 B2     7/2017

\* cited by examiner

HUMAN-POWERED VEHICLE COMPONENT

CROSS-REFERENCE TO RELATED APPLICATIONS

This application claims priority to Japanese Patent Application No. 2018-065722, filed on Mar. 29, 2018. The entire disclosure of Japanese Patent Application No. 2018-065722 is hereby incorporated herein by reference.

BACKGROUND

Technical Field

The present invention generally relates to a human-powered vehicle component.

Background Information

Japanese Laid-Open Patent Publication No. 2012-96614 discloses one example of a human-powered vehicle component that is connected to another human-powered vehicle component to configure a human-powered vehicle system. One of the human-powered vehicle components includes a controller that manages another human-powered vehicle component.

SUMMARY

In a human-powered vehicle system, each human-powered vehicle component can perform only one of managing another human-powered vehicle component and being managed by another human-powered vehicle component.

One object of the present disclosure is to provide a human-powered vehicle component that improves convenience.

A human-powered vehicle component according to a first aspect of the present disclosure comprises a communication device configured to communicate with a first electric component and a second electric component differing in type from the first electric component and an electronic controller configured to be operable in a first control state to manage the first electric component and a second control state managed by the second electric component. The electronic controller is configured to be operable in the first control state upon determining the communication device can communicate with the first electric component but cannot communicate with the second electric component. The electronic controller is configured to be operable in the second control state upon determining the communication device can communicate with the second electric component.

With the human-powered vehicle component according to the first aspect, the electronic controller is operable in the first control state for managing the first electric component and the second control state managed by the second electric component in accordance with the state of communication between the communication device and the first electric component and the second electric component. This improves convenience.

In accordance with a second aspect of the present disclosure, the human-powered vehicle component according to the first aspect is configured so that the second electric component is configured to be provided on a human-powered vehicle.

With the human-powered vehicle component according to the second aspect, in a case in which the human-powered vehicle component can communicate with the second electric component, the human-powered vehicle component can be managed by the second electric component provided on the human-powered vehicle.

In accordance with a third aspect of the present disclosure, the human-powered vehicle component according to the first or second aspect is configured so that the human-powered vehicle component is same type as the first electric component.

With the human-powered vehicle component according to the third aspect, in a case in which the electronic controller can communicate with the first electric component that is of the same type as the human-powered vehicle component including the electronic controller, the electronic controller is operable in the first control state for managing the first electric component.

In accordance with a fourth aspect of the present disclosure, the human-powered vehicle component according to any one of the first to third aspects is configured so that the electronic controller is configured to switch between the first control state and the second control state in accordance with a result of communication with the first electric component and the second electric component.

With the human-powered vehicle component according to the fourth aspect, the electronic controller appropriately switches between the first control state and the second control state in accordance with the result of communication with the first electric component and the second electric component.

In accordance with a fifth aspect of the present disclosure, the human-powered vehicle component according to the fourth aspect is configured so that the electronic controller is configured to switch between the first control state and the second control state in accordance with a first signal being received by the communication device from the first electric component and a second signal being received by the communication device from the second electric component.

With the human-powered vehicle component according to the fifth aspect, the electronic controller appropriately switches between the first control state and the second control state in accordance with the first signal and the second signal.

In accordance with a sixth aspect of the present disclosure, the human-powered vehicle component according to the fifth aspect further includes a memory having inherent information stored therein. The electronic controller is configured to operate in the second control state upon determining the communication device continues to receive the second signal over a time corresponding to the inherent information.

With the human-powered vehicle component according to the sixth aspect, the electronic controller appropriately operates in the second control state in accordance with the time corresponding to the inherent information.

In accordance with a seventh aspect of the present disclosure, the human-powered vehicle component according to the sixth aspect is configured so that the electronic controller is configured to operate in the first control state upon determining the communication device does not receive the second signal during the time corresponding to the inherent information and stops receiving the first signal during the time corresponding to the inherent information.

With the human-powered vehicle component according to the seventh aspect, the electronic controller appropriately operates in the first control state in accordance with the time corresponding to the inherent information.

In accordance with an eighth aspect of the present disclosure, the human-powered vehicle component according to any one of the fifth to seventh aspects is configured so that the first signal and the second signal each include an intermittent signal.

With the human-powered vehicle component according to the eighth aspect, communication congestion is limited.

A human-powered vehicle component according to a ninth aspect of the present disclosure comprises a communication device configured to communicate with a first electric component and an electronic controller configured to be operable in a first control state to manage the first electric component and a third control state managed by the first electric component. The electronic controller is configured to switch between the first control state and the third control state in accordance with a result of communication with the first electric component upon determining the communication device can communicate with the first electric component.

With the human-powered vehicle component according to the ninth aspect, the electronic controller is operable in the first control state for managing the first electric component and the third control state managed by the first electric component in accordance with the result of communication between the communication device and the first electric component.

In accordance with a tenth aspect of the present disclosure, the human-powered vehicle component according to the ninth aspect is configured so that the electronic controller is configured to switch between the first control state and the third control state in accordance with a first signal being received by the communication device from the first electric component.

With the human-powered vehicle component according to the tenth aspect, the electronic controller appropriately switches between the first control state and the third control state in accordance with the first signal.

In accordance with an eleventh aspect of the present disclosure, the human-powered vehicle component according to the tenth aspect further comprises a memory having inherent information stored therein. The electronic controller is configured to operate in the third control state upon determining the communication device continues to receive the first signal over a time corresponding to the inherent information.

With the human-powered vehicle component according to the eleventh aspect, the electronic controller appropriately operates in the third control state in accordance with the time corresponding to the inherent information.

In accordance with a twelfth aspect of the present disclosure, the human-powered vehicle component according to the eleventh aspect is configured so that the electronic controller is configured to operate in the first control state upon determining the communication device stops receiving the first signal during the time corresponding to the inherent information.

With the human-powered vehicle component according to the twelfth aspect, the electronic controller appropriately operates in the first control state in accordance with the time corresponding to the inherent information.

In accordance with a thirteenth aspect of the present disclosure, the human-powered vehicle component according to any one of the ninth to twelfth aspects is configured so that the communication device is configured to communicate with a second electric component that differs in type from the first electric component. The electronic controller is configured to be operable in a second control state managed by the second electric component. The electronic controller is configured to be operable in the second control state upon determining the communication device can communicate with the second electric component.

With the human-powered vehicle component according to the thirteenth aspect, the electronic controller operates in the second control state managed by the second electric component in accordance with the state of communication between the communication device and the second electric component. This improves convenience.

In accordance with a fourteenth aspect of the present disclosure, the human-powered vehicle component according to any one of the first to eighth and thirteenth aspects is configured so that the communication device is configured to perform power line communication with the second electric component.

With the human-powered vehicle component according to the fourteenth aspect, the supply of power and communication with the second electric component are efficiently performed through power line communication.

In accordance with a fifteenth aspect of the present disclosure, the human-powered vehicle component according to any one of the first to eighth, thirteenth, and fourteenth aspects is configured so that the second electric component includes a motor that assists in propulsion of a human-powered vehicle.

With the human-powered vehicle component according to the fifteenth aspect, in a case in which communication can be performed with the second electric component including the motor, the human-powered vehicle component can be managed by the second electric component.

In accordance with a sixteenth aspect of the present disclosure, the human-powered vehicle component according to any one of the first to fifteenth aspects further comprises a battery element. The electronic controller is configured to control at least one of charging and discharging of the battery element.

With the human-powered vehicle component according to the sixteenth aspect, the human-powered vehicle component including the battery element improves convenience.

In accordance with a seventeenth aspect of the present disclosure, the human-powered vehicle component according to the sixteenth aspect further comprises a connector configured to be electrically connected to an external power supply. The first electric component includes a battery element. The electronic controller is configured to manage charging of the battery elements the human-powered vehicle component and the first electric component from the external power supply upon determining the connector is electrically connected to the external power supply in the first control state.

With the human-powered vehicle component according to the seventeenth aspect, the battery element can be appropriately charged by the external power supply.

In accordance with an eighteenth aspect of the present disclosure, the human-powered vehicle component according to any one of the first to seventeenth aspects is configured so that the communication device is configured to perform power line communication with the first electric component.

With the human-powered vehicle component according to the eighteenth aspect, the supply of power and communication with the first electric component are efficiently performed through power line communication.

A human-powered vehicle component according to a nineteenth aspect of the present disclosure comprises an electronic controller electrically connectable to another human-powered vehicle component and an electric component that differs in type from the other human-powered vehicle component. The electronic controller is configured to be operable in a first control state to manage the other human-powered vehicle component and a second control state managed by the electric component. The electronic controller is configured to be operable in the first control state upon determining the electronic controller is electrically connected to the other human-powered vehicle component but not electrically connected to the electric component. The electronic controller is configured to be operable in the second control state upon determining the electronic controller is electrically connected to the electric component.

With the human-powered vehicle component according to the nineteenth aspect, the electronic controller is operable in the first control state for managing the other human-powered vehicle component and the second control state managed by the electric component in accordance with the state of communication with the other human-powered vehicle component and the electric component. This improves convenience.

In accordance with a twentieth aspect of the present disclosure, the human-powered vehicle component according to the nineteenth aspect is configured so that the electric component includes a motor that assists in propulsion of a human-powered vehicle.

The human-powered vehicle component according to the twentieth aspect is controlled by the electric component in a case in which communication can be performed with the electric component including the motor.

In accordance with a twenty-first aspect of the present disclosure, the human-powered vehicle component according to the nineteenth or twentieth aspect further comprises a battery element. The electronic controller controls at least one of charging and discharging of the battery element.

The human-powered vehicle component according to the twenty-first aspect is controlled by the human-powered vehicle component including the battery element.

In accordance with a twenty-second aspect of the present disclosure, the human-powered vehicle component according to the twenty-first aspect further comprises a connector configured to be electrically connected to an external power supply. The other human-powered vehicle component includes a battery element. The electronic controller is configured to manage charging of the battery elements of the human-powered vehicle component and the other human-powered vehicle component from the external power supply upon determining the connector is electrically connected to the external power supply in the first control state.

With the human-powered vehicle component according to the twenty-second aspect, the battery element can be appropriately charged by the external power supply.

The human-powered vehicle component according to the present disclosure improves convenience.

BRIEF DESCRIPTION OF THE DRAWINGS

Referring now to the attached drawings which form a part of this original disclosure.

DETAILED DESCRIPTION OF EMBODIMENTS DISCLOSURE

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

A human-powered vehicle 10 that includes a human-powered vehicle component 30 will now be described with reference to FIGS. 1 to 4. The human-powered vehicle component 30 is provided on the human-powered vehicle 10. The human-powered vehicle 10 is a vehicle that is drivable by at least human driving force. The human-powered vehicle 10 includes, for example, a bicycle. The number of wheels on the human-powered vehicle 10 is not limited. The human-powered vehicle 10 includes, for example, a monocycle and a vehicle having three or more wheels. The human-powered vehicle 10 includes, for example, various types of bicycles such as a mountain bike, a road bike, a city bike, a cargo bike, and a recumbent bike and an electric assist bike (E-bike). In the description hereafter, the human-powered vehicle 10 refers to a bicycle.

Figure 1:
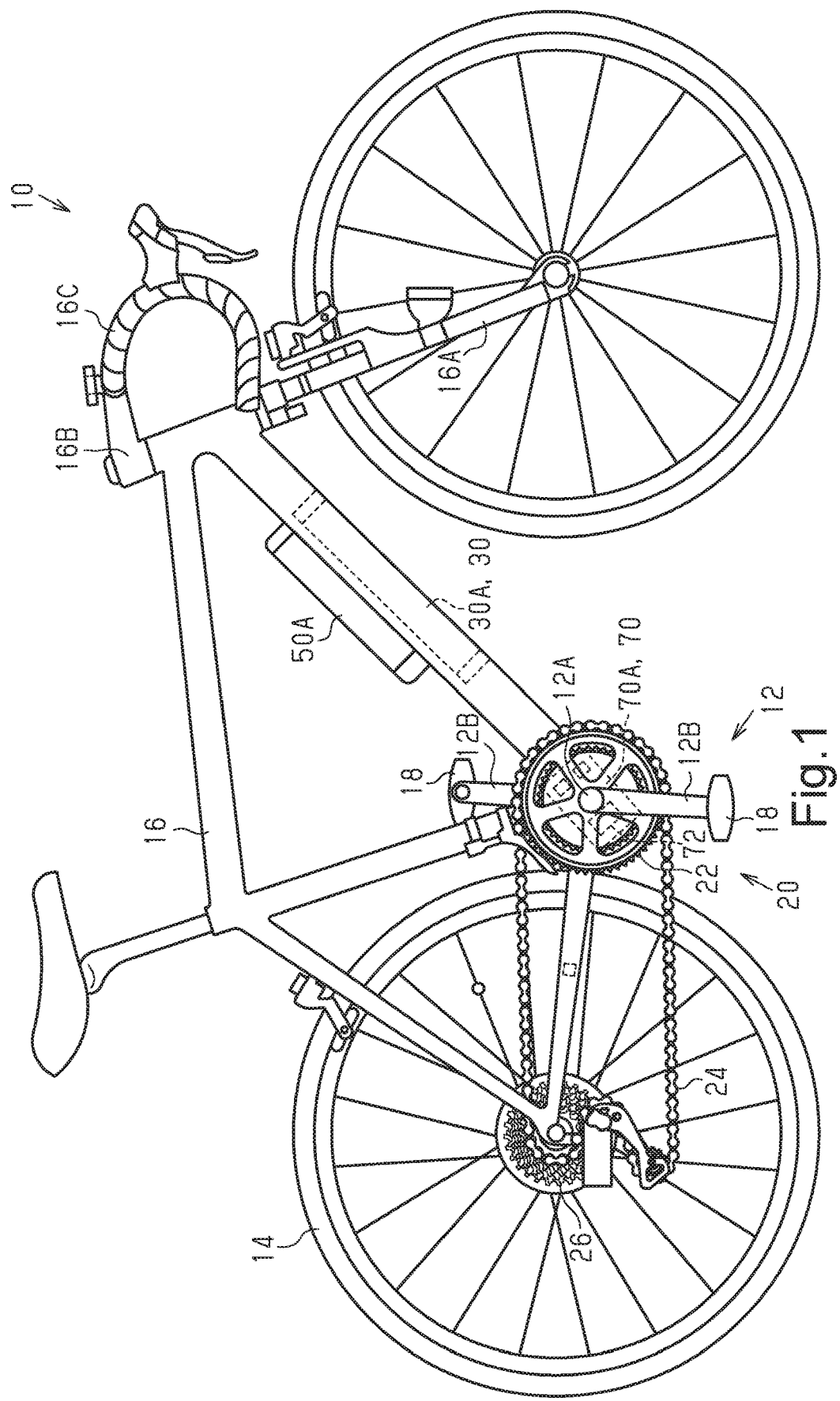
FIG. 1 is a side elevational view of a human-powered vehicle including a human-powered vehicle component in accordance with one illustrated embodiment.

As shown in FIG. 1, the human-powered vehicle 10 includes a crank 12. The human-powered vehicle 10 further includes a drive wheel 14 and a frame 16. Human driving force is input to the crank 12. The crank 12 includes a crankshaft 12A rotatable relative to the frame 16 and a crank arm 12B provided on each of the opposite axial ends of the crankshaft 12A. A pedal 18 is coupled to each of the crank arms 12B. The drive wheel 14 is driven in accordance with rotation of the crank 12. The drive wheel 14 is supported by the frame 16. The crank 12 and the drive wheel 14 are coupled by a drive mechanism 20. The drive mechanism 20 includes a first rotary body 22 coupled to the crankshaft 12A. The crankshaft 12A and the first rotary body 22 can be coupled via a first one-way clutch. The first one-way clutch is configured to allow forward rotation of the first rotary body 22 in a case in which the crank 12 rotates forward and prohibit rearward rotation of the first rotary body 22 in a case in which the crank 12 rotates rearward. The first rotary body 22 includes a sprocket, a pulley, or a bevel gear. The drive mechanism 20 further includes a coupling member 24 and a second rotary body 26. The coupling member 24 transmits rotational force of the first rotary body 22 to the second rotary body 26. The coupling member 24 includes, for example, a chain, a belt, or a shaft.

The second rotary body 26 is coupled to the drive wheel 14. The second rotary body 26 includes a sprocket, a pulley, or a bevel gear. Preferably, a second one-way clutch is provided between the second rotary body 26 and the drive wheel 14. The second one-way clutch is configured to allow forward rotation of the drive wheel 14 in a case in which the second rotary body 26 rotates forward and prohibit rearward rotation of the drive wheel 14 in a case in which the second rotary body 26 rotates rearward.

The human-powered vehicle 10 includes a front wheel and a rear wheel. The front wheel is attached to the frame 16 via a front fork 16A. A handlebar 16C is coupled to the front fork 16A via a stem 16B. In the following description of the embodiment, the drive wheel 14 refers to the rear wheel. However, the front wheel can be the drive wheel 14.

Figure 2:
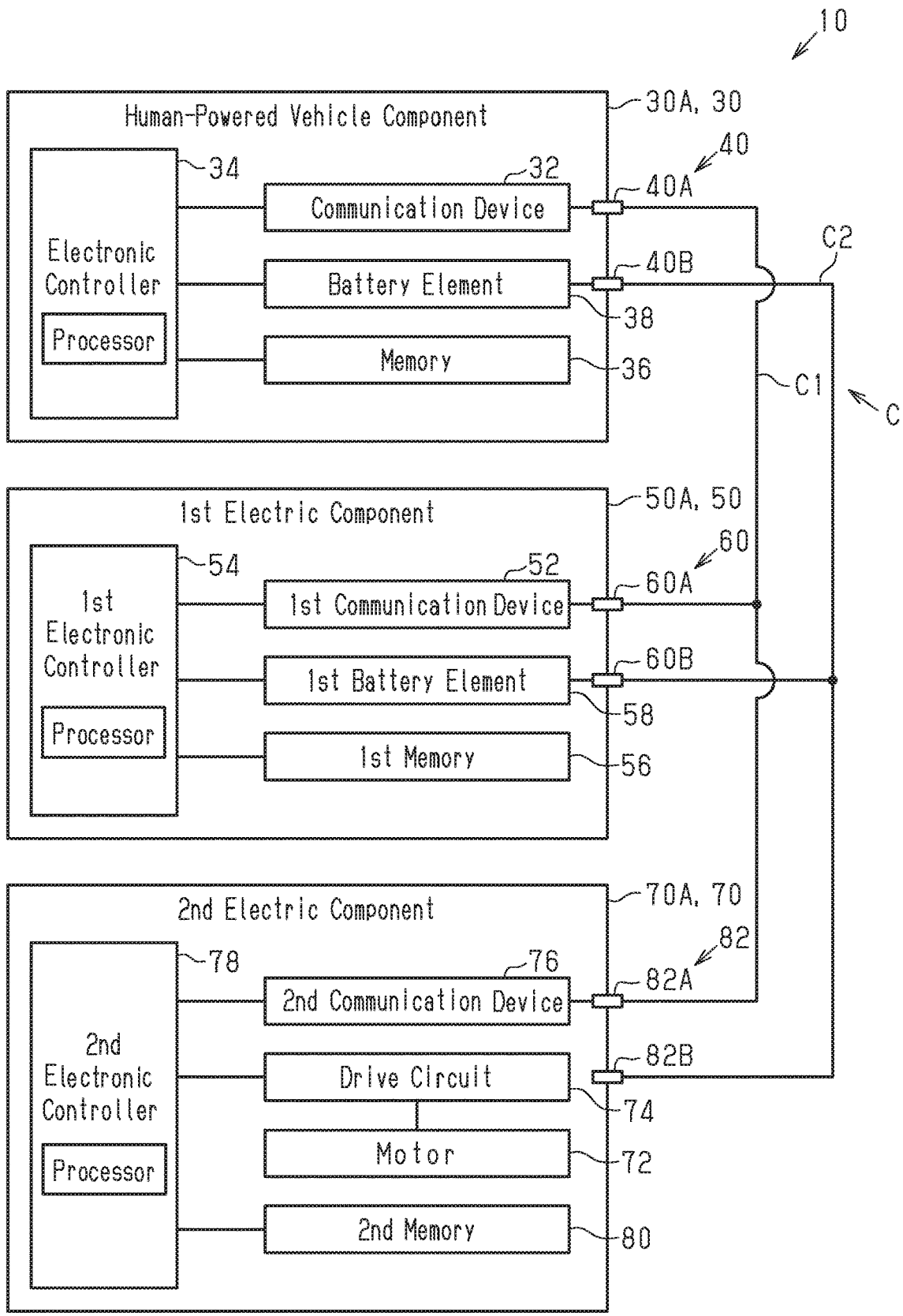
FIG. 2 is a block diagram showing an electrical configuration of the human-powered vehicle of the illustrated embodiment that is connected to a first electric component and a second electric component.

As shown in FIGS. 1 and 2, the human-powered vehicle 10 includes the human-powered vehicle component 30, a first electric component 50, and a second electric component 70. The human-powered vehicle component 30 and the first electric component 50 are provided on the human-powered vehicle 10 to be attachable to and removable from the human-powered vehicle 10. Two or more of the first electric components 50 can be provided on the human-powered vehicle 10.

The human-powered vehicle component 30 is a component that is of the same type as the first electric component 50. The human-powered vehicle component 30 includes a battery unit 30A. The second electric component 70 is a component differing in type from the first electric component 50. Components of the same type refer to components having the same main functions. As long as the main functions are the same, the components of the same type can have different specifications. Components differing in type from each other refer to components having different main functions. The first electric component 50 corresponds to "another human-powered vehicle component." The second electric component 70 corresponds to "an electric component that differs in type from the other human-powered vehicle component."

The human-powered vehicle component 30 includes a communication device 32 and an electronic controller 34. The electronic controller 34 will simply be referred to as the controller 34. The human-powered vehicle component 30 further includes a memory 36. The human-powered vehicle component 30 further includes a battery element 38. The human-powered vehicle component 30 further includes a connector 40. Preferably, the communication device 32, the controller 34, the memory 36, the battery element 38, and the connector 40 are provided on the same housing. The human-powered vehicle component 30 includes a battery unit. The human-powered vehicle component 30 can be attached to the exterior of the frame 16 or can be at least partially accommodated in the frame 16.

The battery element 38 includes one or more battery cells. The battery cells include a rechargeable battery. The battery element 38 supplies electric power to other electric components that are electrically connected to the battery element 38 by wires.

The connector 40 is electrically connectable to an external power supply 90 (refer to FIG. 2). The connector 40 is connected to the external power supply 90 via an electric cable C. The connector 40 is electrically connectable to the first electric component 50 and the second electric component 70. The connector 40 is connected to the first electric component 50 and the second electric component 70 via the electric cable C. The connector 40 includes, for example, an electric connector. The connector 40 includes a first terminal 40A and a second terminal 40B. The first terminal 40A is electrically connected to the communication device 32. The second terminal 40B is electrically connected to the battery element 38. At least one of the first terminal 40A and the second terminal 40B can include a ground terminal connected to ground. The electric cable C includes a first electric cable C1 electrically connected to the first terminal 40A and a second electric cable C2 electrically connected to the second terminal 40B. The first electric cable C1 and the second electric cable C2 can be a single cable or can be multiple cables. The first electric cable C1 and the second electric cable C2 can each include multiple electric wires. The first terminal 40A and the second terminal 40B are detachably connected to the electric cable C. The first terminal 40A and the second terminal 40B can be connected to the electric cable C via a holding device that holds the human-powered vehicle component 30. In this case, the holding device includes electric connectors electrically connected to the first terminal 40A and the second terminal 40B and the electric cable C. Preferably, the holding device is provided on the frame 16 and configured to hold the human-powered vehicle component 30 so that the human-powered vehicle component 30 is attachable to and detachable from the holding device.

The communication device 32 is configured to communicate with the first electric component 50 and the second electric component 70. The communication device 32 is configured to perform, for example, power line communication (PLC) with the first electric component 50. The communication device 32 is configured to perform, for example, power line communication (PLC) with the second electric component 70. In a case in which the communication device 32 performs PLC, the first terminal 40A can be omitted, and the communication device 32 can perform communication via the second terminal 40B.

The terms "controller" and "electronic controller" as used herein refer to hardware that executes a software program and does not include a human. The controller 34 includes an arithmetic processing device (one or more processors) that executes predetermined control programs. The arithmetic processing device includes, for example, a central processing unit (CPU) or a micro processing unit (MPU). The controller 34 can include one or more microcomputers with one or more processors.

The controller 34 controls at least one of discharging and charging of the battery element 38. The controller 34 is configured to operable in a control state for managing at least one of discharging and charging of the battery element 38 and a control state in which at least one of discharging and charging of the battery element 38 is managed by a further component. With respect to the human-powered vehicle component 30, the further component includes one of the first electric component 50 and the second electric component 70. With respect to the human-powered vehicle component 30, the further component can include a component other than the first electric component 50 and the second electric component 70. The control state for managing at least one of discharging and charging of the battery element 38 includes a first control state. The control state in which at least one of discharging and charging of the battery element 38 is managed by the further component includes a second control state and a third control state.

The memory 36 stores information used in various control programs and various control processes. The memory 36 includes any computer storage device or any non-transitory computer-readable medium with the sole exception of a transitory, propagating signal. For example, the memory 36 includes a nonvolatile memory and a volatile memory. The memory 36 stores inherent information of the human-powered vehicle component 30. The inherent information of the human-powered vehicle component 30 is stored in the memory 36, for example, during manufacturing. The inherent information of the human-powered vehicle component 30 includes, for example, information related to a product number or other identification information of the human-powered vehicle component 30. The controller 34 generates information related to a time TA in accordance with the inherent information of the human-powered vehicle component 30. The controller 34, for example, randomly generates the time TA from the product number. In a case of selecting the control state for managing at least one of discharging and charging of the battery element 38, the controller 34 outputs a signal SA from the communication device 32 in accordance with the time TA. Preferably, the signal SA includes an intermittent signal. The signal SA can be a continuous signal. The memory 36 can store information related to the time TA as the inherent information of the human-powered vehicle component 30.

The first electric component 50 includes a first communication device 52 and a first electronic controller 54. The first electronic controller 54 will simply be referred to as the first controller 54. The first electric component 50 further includes a first memory 56, a first battery element 58, and a first connector 60. Preferably, the first communication device 52, the first controller 54, the first memory 56, the first battery element 58, and the first connector 60 are provided on the same housing. The first electric component 50 includes a battery unit 50A. The first electric component 50 can be attached to the exterior of the frame 16 or can be at least partially accommodated in the frame 16. In one example, one of the human-powered vehicle component 30 and the first electric component 50 is attached to the exterior of the frame 16, and the other of the human-powered vehicle component 30 and the first electric component 50 is accommodated in the frame 16.

The first battery element 58 includes one or more battery cells. The battery cells include a rechargeable battery. The first battery element 58 supplies electric power to other electric components that are electrically connected to the first battery element 58 by wires. The number of battery cells in the first battery element 58 can differ from that of the battery element 38.

The first connector 60 is electrically connectable to the external power supply 90 (refer to FIG. 2). The first connector 60 is connected to the external power supply 90 via the electric cable C. The first connector 60 is electrically connectable to the human-powered vehicle component 30 and the second electric component 70. The first connector 60 is electrically connected to the human-powered vehicle component 30 and the second electric component 70 via the electric cable C. The first connector 60 includes, for example, an electric connector. The first connector 60 includes a first terminal 60A and a second terminal 60B. The first terminal 60A is electrically connected to the first communication device 52. The second terminal 60B is electrically connected to the first battery element 58. At least one of the first terminal 60A and the second terminal 60B can include a ground terminal connected to ground. The electric cable C can include multiple electric cables connected to each other. The first terminal 60A is electrically connected to the first electric cable C1, and the second terminal 60B is electrically connected to the second electric cable C2. The first terminal 60A can be omitted, and the first communication device 52 can perform communication via the second terminal 60B. The first terminal 60A and the second terminal 60B are detachably connected to the electric cable C. The first terminal 60A and the second terminal 60B can be connected to the electric cable C via a first holding device that holds the first electric component 50. In this case, the first holding device includes first electric connectors electrically connected to the first terminal 40A and the second terminal 60B and the electric cable C. Preferably, the first holding device is provided on the frame 16 and configured to hold the first electric component 50 so that the first electric component 50 is attachable to and removable from the holding device.

The first communication device 52 is configured to communicate with the human-powered vehicle component 30 and the second electric component 70. The first communication device 52 is configured to perform, for example, power line communication (PLC) with the human-powered vehicle component 30. The first communication device 52 is configured to perform, for example, power line communication (PLC) with the second electric component 70. In a case in which the first communication device 52 performs PLC, the first terminal 60A can be omitted, and the first communication device 52 can perform communication via the second terminal 60B.

The first controller 54 includes an arithmetic processing device that executes predetermined control programs. The arithmetic processing device (one or more processors) includes, for example, a CPU or an MPU. The first controller 54 can include one or more microcomputers with one or more processors.

The first controller 54 controls at least one of discharging and charging of the first battery element 58. The first controller 54 is configured to be operable in a control state for managing at least one of discharging and charging of the first battery element 58 and in a control state in which at least one of discharging and charging of the first battery element 58 is managed by a further component. With respect to the first electric component 50, the further component includes one of the human-powered vehicle component 30 and the second electric component 70. With respect to the first electric component 50, the further component can include a component other than the human-powered vehicle component 30 and the second electric component 70. The control state for managing at least one of discharging and charging of the first battery element 58 includes a fourth control state. The control state in which at least one of discharging and charging of the first battery element 58 is managed by the further component includes a fifth control state and a sixth control state.

The first memory 56 stores information used in various control programs and various control processes. The first memory 56 includes any computer storage device or any non-transitory computer-readable medium with the sole exception of a transitory, propagating signal. For example, the first memory 56 includes a nonvolatile memory and a volatile memory. The first memory 56 stores inherent information of the first electric component 50. The inherent information of the first electric component 50 is stored in the first memory 56, for example, during manufacturing. The inherent information of the first electric component 50 includes, for example, information related to a product number or other identification information of the first electric component 50. The first controller 54 generates information related to a time TB in accordance with the inherent information of the first electric component 50. The first controller 54, for example, randomly generates the time TB from the product number of the first electric component 50. The time TB differs from the time TA, which is stored in the memory 36 of the human-powered vehicle component 30. The first memory 56 can store information related to the time TB as the inherent information of the first electric component 50. In a case in which the first electric component 50 and the human-powered vehicle component 30 are of the same type and have different specifications, the times TA and TB corresponding to the components 30 and 50 differ from each other. In a case of selecting the control state for managing at least one of discharging and charging of the first battery element 58, the first controller 54 outputs a first signal S1 from the first communication device 52 in accordance with time TB. Preferably, the first signal S1 includes an intermittent signal. The first signal S1 can be a continuous signal.

As shown in FIGS. 1 and 2, the second electric component 70 is provided on the human-powered vehicle 10. The second electric component 70 includes a motor 72. The motor 72 forms a drive unit 70A together with a drive circuit 74, a second communication device 76, a second electronic controller 78, a second memory 80, and a second connector 82. The second electronic controller 78 will simply be referred to as the second controller 78. Preferably, the motor 72, the drive circuit 74, the second communication device 76, the second controller 78, the second memory 80, and the second connector 82 are provided on the same housing. The drive circuit 74 controls electric power supplied from the human-powered vehicle component 30 and the first electric component 50 to the motor 72. The drive circuit 74 is connected to perform wired or wireless communication with the second controller 78. The drive circuit 74 can communicate with the second controller 78, for example, through serial communication. The drive circuit 74 drives the motor 72 in accordance with a control signal from the second controller 78. The drive circuit 74 includes an inverter circuit. The drive circuit 74 can be included in the second controller 78. The motor 72 is configured to assist in propulsion of the human-powered vehicle 10. The motor 72 includes an electric motor. The motor 72 is provided to transmit rotation to the front wheel or a human diving force transmission path extending from the pedals 18 to the rear wheel. The motor 72 is provided on the frame 16 of the human-powered vehicle 10, the rear wheel, or the front wheel. In the present embodiment, the motor 72 is coupled to the power transmission path between the crankshaft 12A and the first rotary body 22. Preferably, a one-way clutch is provided on the power transmission path between the motor 72 and the crankshaft 12A so that in a case in which the crankshaft 12A is rotated in a direction forwardly moving the human-powered vehicle 10, the rotational force of the crank 12 will not rotate the motor 72. Configurations other than the motor 72 and the drive circuit 74 can be provided on the housing on which the motor 72 and the drive circuit 74 are provided. For example, a speed reduction unit that reduces speed of rotation of the motor 72 and outputs the rotation can be provided on the housing.

The second connector 82 is electrically connectable to the human-powered vehicle component 30 and the first electric component 50. The second connector 82 is electrically connected to the human-powered vehicle component 30 and the first electric component 50 via the electric cable C. The second connector 82 includes, for example, an electric connector. The second connector 82 includes a first terminal 82A and a second terminal 82B. The first terminal 82A is electrically connected to the second communication device 76. The second terminal 82B is electrically connected to the drive circuit 74. Preferably, a switch is provided between the second terminal 82B and the drive circuit 74. The switch is activated and deactivated to supply power from the second terminal 82B to the drive circuit 74 and stop the supply of power. Preferably, the second terminal 82B is also electrically connected to the second controller 78 and configured to supply power to the second controller 78. At least one of the first terminal 82A and the second terminal 82B can include a ground terminal connected to ground. The first terminal 82A and the second terminal 82B can be detachably connected to the electric cable C or can be unremovably connected to the electric cable C.

The second communication device 76 is configured to communicate with the human-powered vehicle component 30 and the first electric component 50. The second communication device 76 is configured to perform, for example, power line communication (PLC) with the human-powered vehicle component 30. The second communication device 76 is configured to perform, for example, power line communication (PLC) with the second electric component 70. In a case in which the second communication device 76 performs PLC, the first terminal 82A can be omitted, and the second communication device 76 can perform communication via the second terminal 82B.

The second controller 78 includes an arithmetic processing device (one or more processors) that executes predetermined control programs. The arithmetic processing device includes, for example, a CPU or an MPU with one or more processors. The second controller 78 can include one or more microcomputers. The second controller 78 controls the motor 72 in accordance with a travel state of the human-powered vehicle 10. For example, the second controller 78 controls the motor 72 in accordance with an output of a sensor that detects human driving force. For example, the second controller 78 controls the motor 72 so that a ratio of assist power of the motor 72 to the human driving force is set to a predetermined ratio.

The second memory 80 stores information used in various control programs and various control processes. The second memory 80 includes any computer storage device or any non-transitory computer-readable medium with the sole exception of a transitory, propagating signal. For example, the second memory 80 includes a nonvolatile memory and a volatile memory. The second memory 80 stores inherent information of the second electric component 70. The inherent information of the second electric component 70 is stored in the second memory 80, for example, during manufacturing. The inherent information of the second electric component 70 includes, for example, information related to a product number or other identification information of the second electric component 70. The second controller 78 generates information related to a time TC in accordance with the inherent information of the second electric component 70. The second controller 78, for example, randomly generates the time TC from the product number of the second electric component 70. The time TC differs from the time TA, which is stored in the memory 36 of the human-powered vehicle component 30, and the time TB, which is stored in the first memory 56 of the first electric component 50. The time TC is longer than the time TA and the time TB. For example, in a case in which the controller 34, the first controller 54, and the second controller 78 randomly generate times from the product numbers through a common method, a process is performed so that the time TC, which is generated from the inherent information of the second electric component 70, is set to be longer than the time TA and the time TB. The second memory 80 can store information related to the time TC as the inherent information of the second electric component 70. In a case of selecting the control state for managing at least one of discharging and charging of the battery element 38 and the first battery element 58, the second controller 78 outputs a second signal S2 from the second communication device 76 in accordance with the time TC. Preferably, the second signal S2 includes an intermittent signal. The second signal S2 can be a continuous signal.

Figure 3:
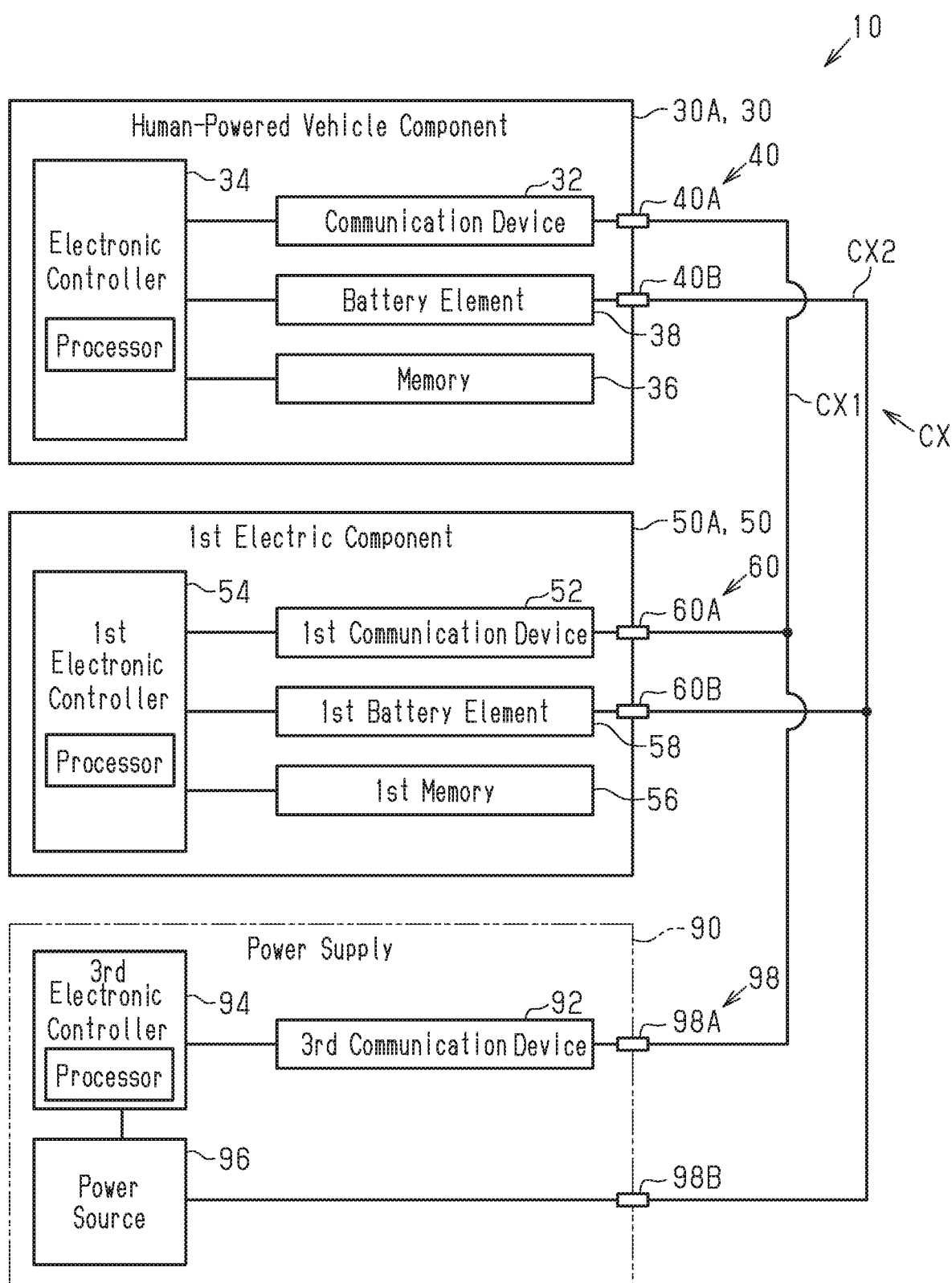
FIG. 3 is a block diagram showing an electrical configuration of the human-powered vehicle component of the illustrated embodiment and the first electric component that are connected to an external power supply.

As shown in FIG. 3, the human-powered vehicle component 30 and the first electric component 50 can be removed from the human-powered vehicle 10 and connected in parallel to the external power supply 90 via an electric cable CX. The electric cable CX and the electric cable C have the same configuration. The electric cable CX includes a first electric cable CX1 electrically connected to the first terminals 40A and 60A and a second electric cable CX2 electrically connected to the second terminals 40B and 60B. The first electric cable CX1 and the first electric cable C1 have the same configuration. The second electric cable CX2 and the second electric cable C2 have the same configuration. The external power supply 90 includes a third communication device 92, a third controller 94, a power source 96, and a third connector 98. One of the human-powered vehicle component 30 and the first electric component 50 can be solely connected to the external power supply 90 via the electric cable CX. The external power supply 90 functions as a charger.

The power source 96 includes at least one of an alternating-current power source and a direct-current power source. In a case of including an alternating-current power source, the power source 96 includes an AC-DC converter. The power source 96 can be a household alternating-current power source or can be a commercial charging station.

The third connector 98 is electrically connectable to the human-powered vehicle component 30 and the first electric component 50. The third connector 98 is electrically connected to the human-powered vehicle component 30 and the first electric component 50 via the electric cable CX. The third connector 98 includes, for example, an electric connector. The third connector 98 includes a first terminal 98A and a second terminal 98B. The first terminal 98A is electrically connected to the third communication device 92. The second terminal 98B is electrically connected to the power source 96. At least one of the first terminal 98A and the second terminal 98B can include a ground terminal connected to ground. The electric cable CX can include multiple electric cables connected to each other. The first terminal 82A and the second terminal 82B can be detachably connected to the electric cable CX or can be unremovably connected to the electric cable CX.

The third communication device 92 is configured to communicate with at least one of the human-powered vehicle component 30 and the first electric component 50. The third communication device 92 is configured to perform power line communication (PLC) with the human-powered vehicle component 30. The third communication device 92 is configured to perform power line communication (PLC) with the first electric component 50. The third communication device 92 can communicate with the human-powered vehicle component 30 through CAN or other communication methods. The third communication device 92 can communicate with the first electric component 50 through CAN or other communication methods. In a case in which the third communication device 92 performs PLC, the first terminal 98A can be omitted, and the third communication device 92 can perform communication via the second terminal 98B.

The third controller 94 includes an arithmetic processing device (one or more processors) that executes predetermined control programs. The arithmetic processing device includes, for example, a CPU or an MPU. The third controller 94 can include one or more microcomputers with one or more processors.

The third controller 94 controls charging of the battery element 38 and the first battery element 58 in accordance with information that the third communication device 92 receives from one of the human-powered vehicle component 30 and the first electric component 50.

The controller 34 of the human-powered vehicle component 30 is configured to be operable in a first control state for managing the first electric component 50 and a second control state managed by the second electric component 70. The controller 34 is configured to be operable in the first control state for managing the first electric component 50 and a third control state managed by the first electric component 50. In the present embodiment, the controller 34 is configured to be operable in one of the first control state, the second control state, and the third control state in accordance with a result of communication with at least one of the first electric component 50 and the second electric component 70.

The controller 34 switches between the first control state and the second control state in accordance with the result of communication with the second electric component 70. The controller 34 switches between the first control state and the second control state in accordance with the result of communication with the first electric component 50 and the second electric component 70. In the present embodiment, the controller 34 switches between the first control state and the third control state in accordance with the result of communication with the first electric component 50. In the present embodiment, the controller 34 switches among the first control state, the second control state, and the third control state in accordance with the result of communication with the first electric component 50 and the second electric component 70.

In a case in which a request for selecting the control state is made, the human-powered vehicle component 30 starts to transmit the signal SA from the communication device 32 and continues the transmission of the signal SA until the time TA elapses. For example, in a case in which the connection state is changed, the first electric component 50 starts to transmit the first signal S1 from the first communication device 52 and continues the transmission of the first signal S1 until the time TB elapses. In a case in which the connection state is changed, the second electric component 70 starts to transmit the second signal S2 from the second communication device 76 and continues the transmission of the second signal S2 until the time TC elapses. The controller 34, the first controller 54, and the second controller 78 determine that the connection state has changed and start to transmit the respective signals SA, S1, and S2, for example, in a case in which the state of the communication devices 32, 52, and 76 is changed from receiving identification information of at least one component to not receiving the identification information and in a case in which the state of the communication devices 32, 52, and 76 is changed from not receiving identification information of at least one component to receiving the identification information. The controller 34, the first controller 54, and the second controller 78 can determine that the request for selecting the control state is made and start to transmit the respective signals SA, S1, S2 in a case in which at least one of the human-powered vehicle component 30 and the first electric component 50 starts to supply power to the second electric component 70.

The controller 34 switches between the first control state and the second control state in accordance with the second signal S2 that the communication device 32 receives from the second electric component 70. The controller 34 switches between the first control state and the third control state in accordance with the first signal S1 that the communication device 32 receives from the first electric component 50. In the present embodiment, the controller 34 switches between the first control state and the second control state in accordance with the first signal S1 being received by the communication device 32 from the first electric component 50 and the second signal S2 being received by the communication device 32 the second electric component 70. In the present embodiment, the controller 34 switches among the first control state, the second control state, and the third control state in accordance with the first signal S1 being received by the communication device 32 from the first electric component 50 and the second signal S2 being received by the communication device 32 from the second electric component 70.

The controller 34 is configured to be operable in the second control state in a case in which the communication device 32 can communicate with the second electric component 70. The controller 34 operates in the second control state in a case in which the communication device 32 can communicate with the first electric component 50 and the second electric component 70. The controller 34 operates in the second control state in a case in which the communication device 32 cannot communicate with the first electric component 50 but can communicate with the second electric component 70.

In the present embodiment, in a case in which the communication device 32 can communicate with the first electric component 50, the controller 34 switches between the first control state and the third control state in accordance with a result of communication with the first electric component 50. In the present embodiment, the controller 34 is configured to be operable in the first control state in a case in which the communication device 32 can communicate with the first electric component 50 but cannot communicate with the second electric component 70. In a case in which the communication device 32 can communicate with the first electric component 50 but cannot communicate with the second electric component 70, the controller 34 operates in one of the first control state and the third control state.

In a case of selecting the control state, the controller 34 determines the control state before or when the time from the transmission of the signal SA reaches the time TA corresponding to the inherent information of the human-powered vehicle component 30. In a case in which the communication device 32 continues to receive the second signal S2 over the time TA corresponding to the inherent information of the human-powered vehicle component 30, the controller 34 operates in the second control state. In a case in which the communication device 32 does not receive the second signal S2 and the first signal S1 during the time TA corresponding to the inherent information of the human-powered vehicle component 30, the controller 34 operates in the first control state. In a case in which the communication device 32 does not receive the second signal S2 during the time TA corresponding to the inherent information of the human-powered vehicle component 30 and stops receiving the first signal S1 during the time TA corresponding to the inherent information of the human-powered vehicle component 30, the controller 34 operates in the first control state. In a case in which communication cannot be performed with the second electric component 70 and the communication device 32 continues receiving first signal S1 over the time TA corresponding to the inherent information of the human-powered vehicle component 30, the controller 34 operates in the third control state. In a case in which communication cannot be performed with the second electric component 70 and the communication device 32 stops receiving the first signal S1 during the time TA corresponding to the inherent information of the human-powered vehicle component 30, the controller 34 operates in the first control state.

The first controller 54 of the first electric component 50 is configured to be operable in a fourth control state for managing the human-powered vehicle component 30 and a fifth control state managed by the second electric component 70. In the present embodiment, the first controller 54 is configured to be operable in the fourth control state for managing the human-powered vehicle component 30 and a sixth control state managed by the human-powered vehicle component 30. In the present embodiment, the first controller 54 is configured to be operable in one of the fourth control state, the fifth control state, and the sixth control state in accordance with a result of communication with at least one of the human-powered vehicle component 30 and the second electric component 70. The fourth control state of the first electric component 50 corresponds to the first control state of the human-powered vehicle component 30 and is a state for managing the human-powered vehicle component 30. The fifth control state of the first electric component 50 corresponds to the second control state of the human-powered vehicle component 30 and is a state managed by the second electric component 70. The sixth control state corresponds to the third control state of the human-powered vehicle component 30 and is a state managed by the human-powered vehicle component 30.

The first controller 54 switches between the fourth control state and the fifth control state in accordance with the result of communication with the second electric component 70. In the present embodiment, the first controller 54 switches between the fourth control state and the fifth control state in accordance with the result of communication with the human-powered vehicle component 30 and the second electric component 70. In the present embodiment, the first controller 54 switches between the fourth control state and the sixth control state in accordance with the result of communication with the human-powered vehicle component 30. In the present embodiment, the first controller 54 switches among the fourth control state, the fifth control state, and the sixth control state in accordance with the result of communication with the human-powered vehicle component 30 and the second electric component 70.

The first controller 54 switches between the fourth control state and the fifth control state in accordance with the second signal S2 that the first communication device 52 receives from the second electric component 70. In the present embodiment, the first controller 54 switches between the fourth control state and the sixth control state in accordance with the signal SA being received by the first communication device 52 from the human-powered vehicle component 30. In the present embodiment, the first controller 54 switches between the fourth control state and the fifth control state in accordance with the signal SA being received by the first communication device 52 from the human-powered vehicle component 30 and the second signal S2 being received by the first communication device 52 from the second electric component 70. In the present embodiment, the first controller 54 switches among the fourth control state, the fifth control state, and the sixth control state in accordance with the signal SA being received by the first communication device 52 from the human-powered vehicle component 30 and the second signal S2 being received by the first communication device 52 from the second electric component 70.

The first controller 54 is configured to be operable in the fifth control state in a case in which the first communication device 52 can communicate with the second electric component 70. In a case in which the first communication device 52 can communicate with the human-powered vehicle component 30 and the second electric component 70, the first controller 54 operates in the fifth control state. In a case in which the first communication device 52 cannot communicate with the human-powered vehicle component 30 but can communicate with the second electric component 70, the first controller 54 operates in the fifth control state.

In the present embodiment, in a case in which the first communication device 52 can communicate with the human-powered vehicle component 30, the first controller 54 switches between the fourth control state and the sixth control state in accordance with a result of communication with the human-powered vehicle component 30. In the present embodiment, the first controller 54 is configured to be operable in the fourth control state in a case in which the first communication device 52 can communicate with the human-powered vehicle component 30 but cannot communicate with the second electric component 70. In a case in which the first communication device 52 can communicate with the human-powered vehicle component 30 but cannot communicate with the second electric component 70, the first controller 54 operates in one of the fourth control state and the sixth control state.

In a case of selecting the control state, the first controller 54 determines the control state before or when the time from the transmission of the signal S1 reaches the time TB corresponding to the inherent information of the first electric component 50. In a case in which the first communication device 52 continues to receive the second signal S2 over the time TB corresponding to the inherent information of the first electric component 50, the first controller 54 operates in the fifth control state. In a case in which the first communication device 52 does not receive the second signal S2 and the signal SA during the time TB corresponding to the inherent information of the first electric component 50, the first controller 54 operates in the fourth control state. In a case in which the first communication device 52 does not receive the second signal S2 during the time TB corresponding to the inherent information of the first electric component 50 and stop receiving the signal SA during the time TB corresponding to the inherent information of the first electric component 50, the first controller 54 operates in the fourth control state. In a case in which communication cannot be performed with the second electric component 70 and the first communication device 52 continues to receive the signal SA over time TB corresponding to the inherent information of the first electric component 50, the first controller 54 operates in the sixth control state. In a case in which communication cannot be performed with the second electric component 70 and the first communication device 52 stops receiving the signal SA during the time TB corresponding to the inherent information of the first electric component 50, the first controller 54 operates in the fourth control state.

In a case in which the connector 40 of the human-powered vehicle component 30 is electrically connected to the external power supply 90 in the first control state, the controller 34 manages charging of the battery element 38 and the first battery element 58 from the external power source 96. In a case in which the controller 34 is in the first control state and the first controller 54 is in the sixth control state, the controller 34 manages charging of the battery element 38 and the first battery element 58. In a case of managing the charging of the battery element 38 and the first battery element 58, the controller 34 selects one of the battery element 38 and the first battery element 58 for charging in accordance with the battery level and capacity of the battery element 38 and the first battery element 58. The priority of charging is given to the selected one of the battery element 38 and the first battery element 58. In a case in which the charging of the battery element 38 and the first battery element 58 is completed, the controller 34 can stop the supply of power to the third controller 94 via the third communication device 92.

In a case in which the connector 40 of the human-powered vehicle component 30 is electrically connected to the external power supply 90 and the controller 34 is in the third control state, the first controller 54 manages charging of the battery element 38 and the first battery element 58 from the external power source 96. In a case in which the controller 34 is in the third control state and the first controller 54 is in the fourth control state, the first controller 54 manages charging of the battery element 38 and the first battery element 58. In a case of managing the charging of the battery element 38 and the first battery element 58, the first controller 54 selects one of the battery element 38 and the first battery element 58 in accordance with the battery level and capacity of the battery element 38 and the first battery element 58. The priority of charging is given to the selected one of the battery element 38 and the first battery element 58. In a case in which the charging of the battery element 38 and the first battery element 58 is completed, the first controller 54 can stop the supply of power to the third controller 94 via the third communication device 92.

In a case in which the connector 40 of the human-powered vehicle component 30 is connected to the second electric component 70 in the second control state, the second controller 78 manages discharging of the battery element 38 and the first battery element 58. In a case in which the second controller 78 is in the first control state, the controller 34 is in the second control state, and the first controller 54 is in the fifth control state, the second controller 78 manages discharging of the battery element 38 and the first battery element 58. In a case of managing the discharging of the battery element 38 and the first battery element 58, the second controller 78 selects one of the battery element 38 and the first battery element 58, the power of which is used, in accordance with the battery level and capacity of the battery element 38 and the first battery element 58. The selected one of the battery element 38 and the first battery element 58 discharges.

Figure 4:
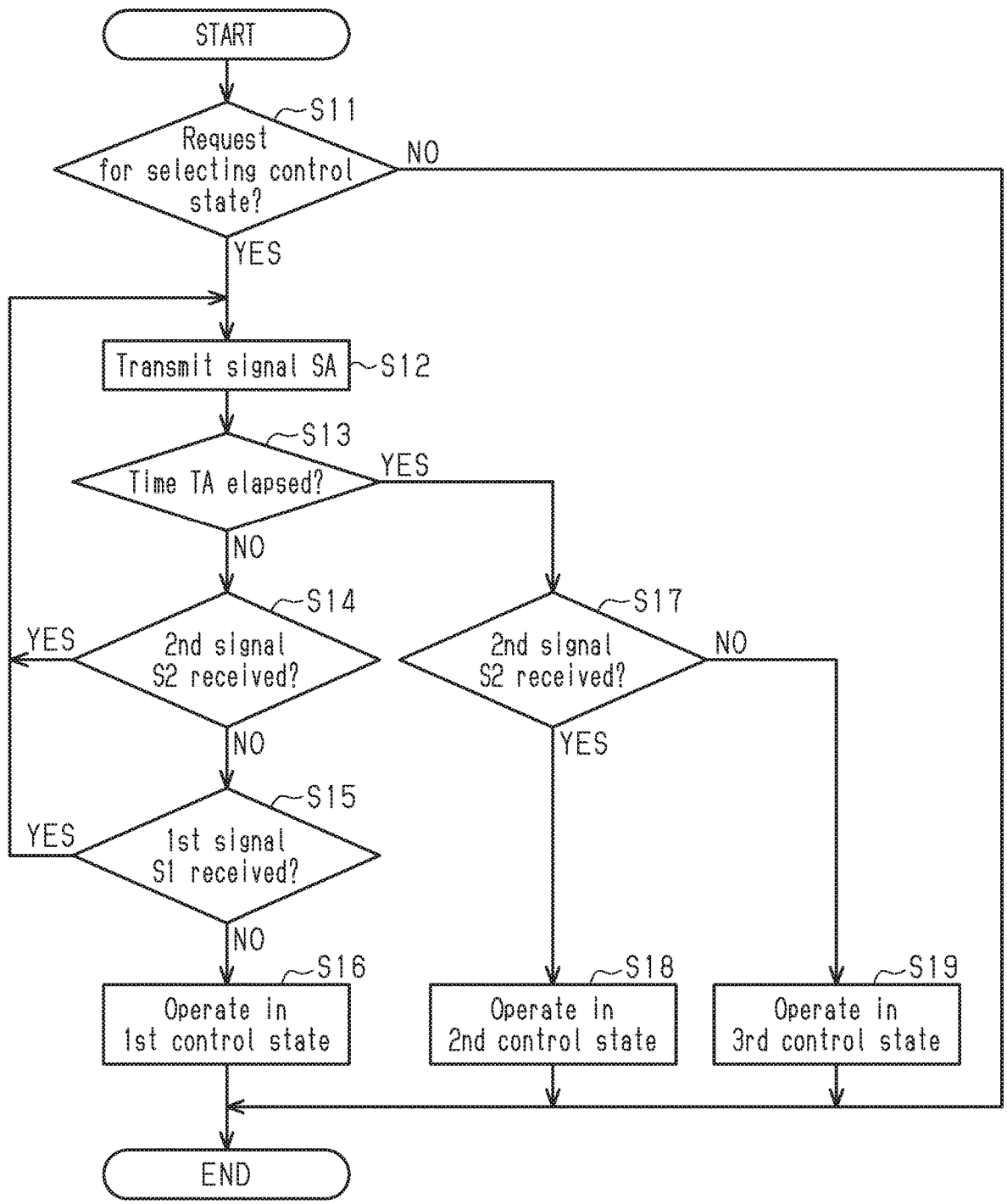
FIG. 4 is a flowchart of a control process for selecting a control state that is executed by the electronic controller of the human-powered vehicle component shown in FIG. 2.

The control process of selecting the control state executed by the controller 34 of the human-powered vehicle component 30 will now be described with reference to FIG. 4. In a case in which the controller 34 is supplied with power from the battery element 38, the controller 34 starts the control process and proceeds to step S11 of the flowchart shown in FIG. 4. As long as the power is supplied, the controller 34 executes the control process from step S11 in predetermined cycles.

In step S11, the controller 34 determines whether or not a request for selecting the control state is made. The controller 34 determines that the request for selecting the control state is made, for example, in at least one of the following cases. The cases are a case in which the state of the communication device 32 is changed from receiving identification information of at least one component to not receiving the identification information, a case in which the state of the communication device 32 is changed from not receiving identification information of at least one component to receiving the identification information, and a case in which the second electric component 70 starts to be supplied with power from at least one of the human-powered vehicle component 30 and the first electric component 50. In a case in which the request for selecting the control state is not made, the controller 34 ends the process. In a case in which the request for selecting the control state is made, the controller 34 proceeds to step S12.

In step S12, the controller 34 transmits the signal SA from the communication device 32 and proceeds to step S13. In step S13, the controller 34 determines whether or not the time TA has elapsed. The controller 34 determines that the time TA has elapsed, for example, in a case in which the time from when the determination of the request for selecting the control state is made in step S11 is greater than or equal to the time TA. In a case in which the time TA has not elapsed in step S13, the controller 34 proceeds to step S14.

In step S14, the controller 34 determines whether or not the second signal S2 is received. The controller 34 determines that the second signal S2 is received, for example, in a case in which the second signal S2 was received from a predetermined amount of time before the determination in step S14 to the time of the determination in step S14. In a case in which the second signal S2 is received, the controller 34 proceeds to step S12. In a case in which the second signal S2 is not received, the controller 34 proceeds to step S15.

In step S15, the controller 34 determines whether or not the first signal S1 is received. The controller 34 determines that the first signal S1 is received, for example, in a case in which the first signal S1 was received from a predetermined amount of time before the determination in step S15 to the time of the determination in step S15. In a case in which the first signal S1 is received, the controller 34 proceeds to step S12. In a case in which the first signal S1 is not received, the controller 34 proceeds to step S16. In step S16, the controller 34 operates in the first control state and ends the process.

In a case in which it is determined in step S13 that time TA has elapsed, the controller 34 proceeds to step S17. In step S17, the controller 34 determines whether or not the second signal S2 is received. The controller 34 determines that the second signal S2 is received, for example, in a case in which the second signal S2 was received from a predetermined amount of time before the determination in step S17 to the time of the determination in step S17. In a case in which the second signal S2 is received, the controller 34 proceeds to step S18. In step S18, the controller 34 operates in the second control state and ends the process.

In a case in which it is determined in step S17 that the second signal S2 is not received, the controller 34 proceeds to step S19. In step S19, the controller 34 operates in the third control state and ends the control process.

The first controller 54 of the first electric component 50 uses the same control process as the controller 34 of the human-powered vehicle component 30 to select the control state. In this case, the control process of FIG. 4 is changed such that the first control state in is changed to the fourth control state, the second control state is changed to the fifth control state, the third control state is changed to the sixth control state, the time TA is changed to the time TB, the signal SA is changed to the first signal S1, and the first signal S1 is changed to the signal SA.

The second controller 78 of the second electric component 70 can be configured to be switchable between a first state for managing the first electric component 50 and the second electric component 70 and a second state for not managing the first electric component 50 and the second electric component 70. In this case, for example, after the second signal S2 starts to be transmitted, if the signal SA and the first signal S1 are received and the reception of the signal SA and the first signal S1 stops before the time TC elapses, then the second controller 78 of the second electric component 70 operates in the second state. In a case in which the signal SA and the first signal S1 are not received from the time in which the transmission of the second signal S2 is started until the time TC elapses, the second controller 78 of the second electric component 70 operates in the second state. In a case in which the second electric component 70 operates in the second state, the second controller 78 is configured to be supplied with power from a power source that differs from the first electric component 50 and the second electric component 70. In a case in which the second controller 78 does not include a power source that differs from the first electric component 50 and the second electric component 70, the second state may be omitted.

In a case in which the human-powered vehicle component 30 and the first electric component 50 can communicate with the second electric component 70, the human-powered vehicle component 30 and the first electric component 50 are managed by the second electric component 70. In a case in which the human-powered vehicle component 30 and the first electric component 50 cannot communicate with the second electric component 70, the human-powered vehicle component 30 and the first electric component 50 is managed by one of the human-powered vehicle component 30 and the first electric component 50. Thus, even in a case in which the human-powered vehicle component 30 and the first electric component 50 cannot communicate with the second electric component 70, the human-powered vehicle component 30 and the first electric component 50 are appropriately managed.

MODIFICATIONS

The description related to the embodiment exemplifies, without any intention to limit, applicable forms of a human-powered vehicle component according to the present disclosure. The human-powered vehicle component according to the present disclosure can be applicable to, for example, modifications of the embodiment that are described below and combinations of at least two of the modifications that do not contradict each other. In the modifications described below, the same reference characters are given to those elements that are the same as the corresponding elements of the embodiment. Such elements will not be described in detail.

Figure 5:
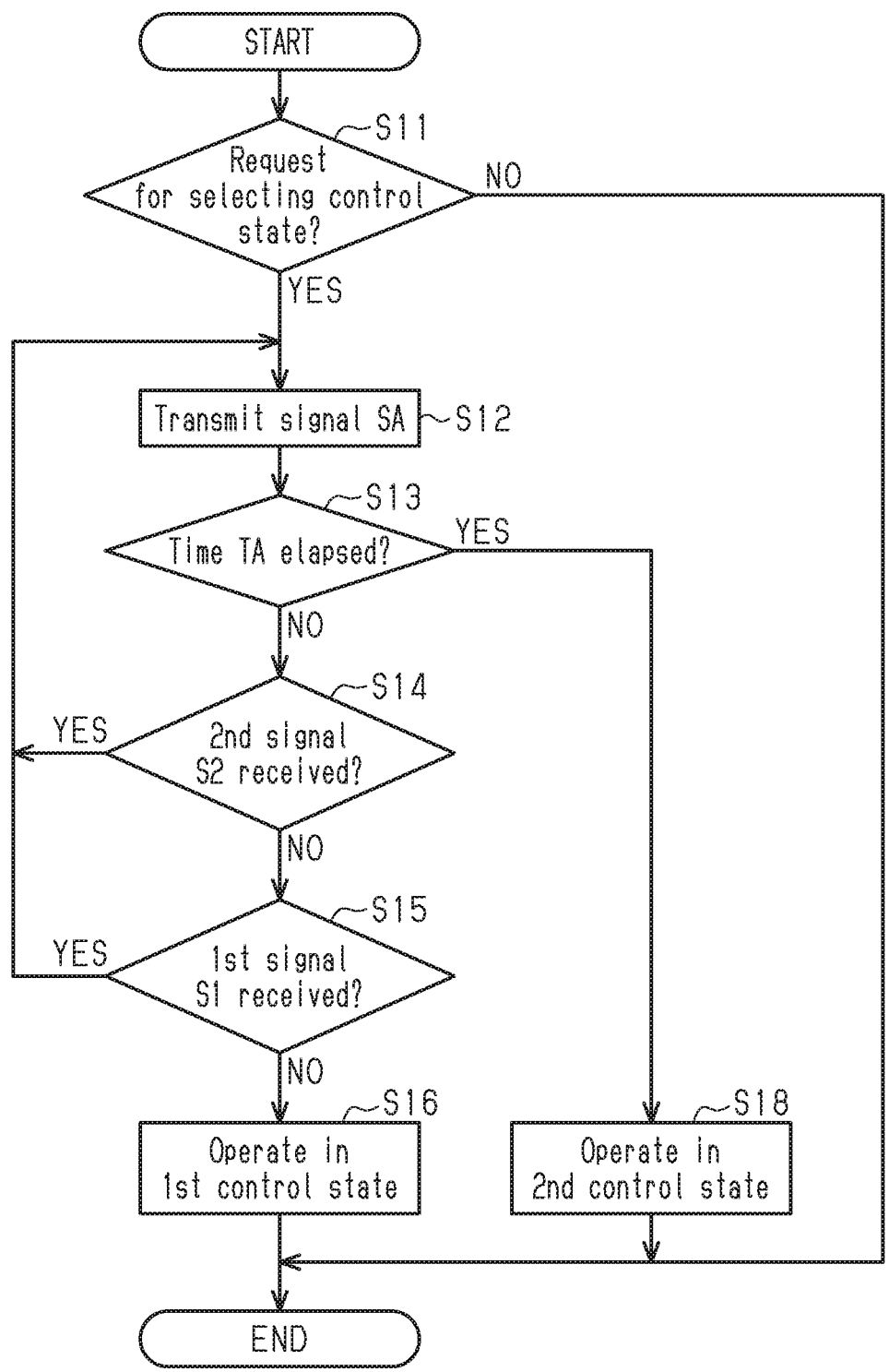
FIG. 5 is a flowchart of a first modified control process for selecting a control state that is executed by the electronic controller of the human-powered vehicle component of the illustrated embodiment.

The third control state can be omitted from the controller 34 of the human-powered vehicle component 30. Since the second control state and the third control state are states for being managed by other components 50 and 70, the control process program of the third control state can be the same as that of the second control state. In this case, the control process shown in FIG. 4 can be changed to the control process shown in FIG. 5. The control process of FIG. 5 omits steps S17 and S19 from FIG. 4. In the process of FIG. 5, in a case in which the controller 34 determines in step S13 that the time TA has elapsed, the controller 34 operates in the second control state in step S18 and ends the process. In the same manner, the sixth control state can be omitted from the first electric component 50.

Figure 6:
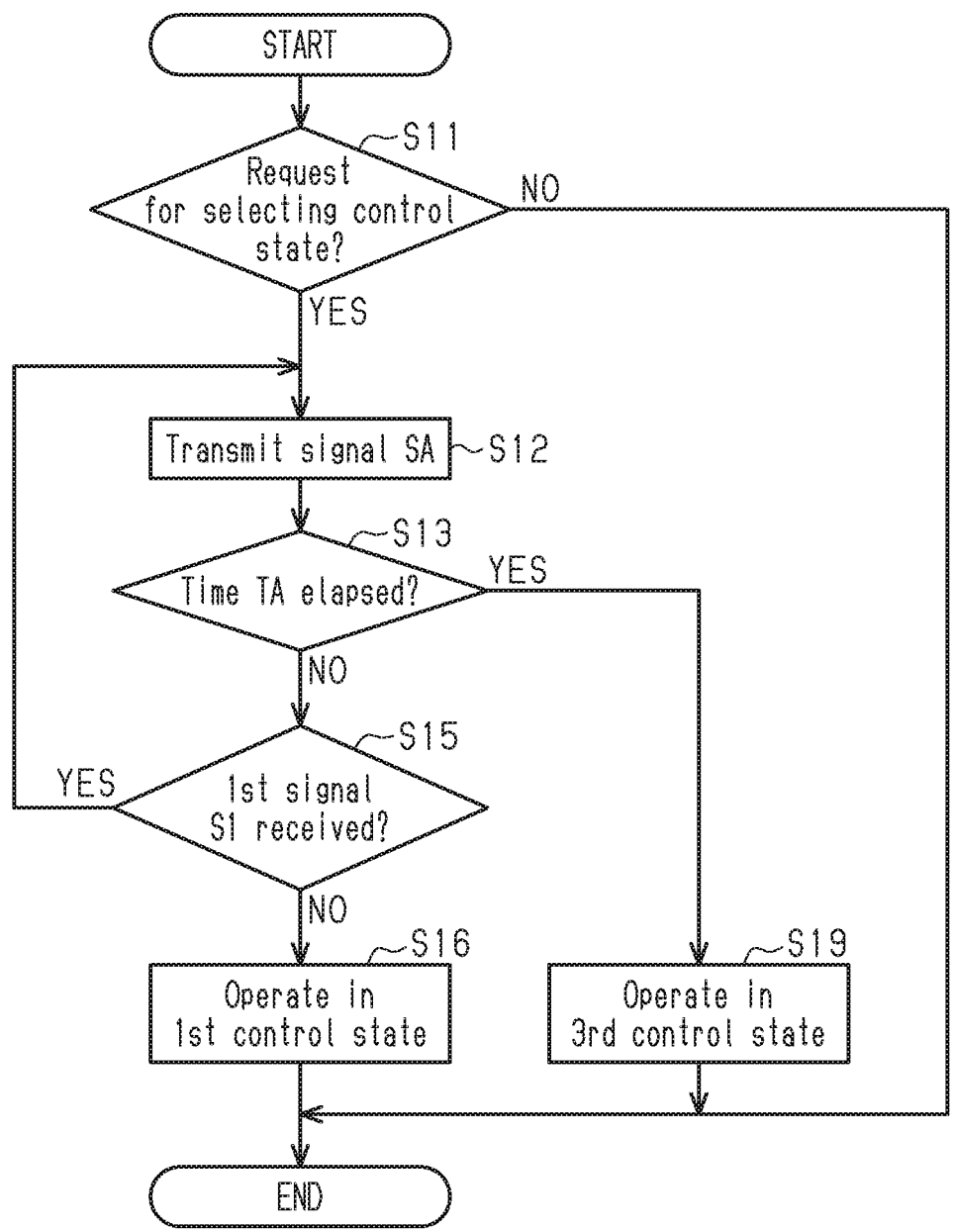
FIG. 6 is a flowchart of a second modified control process for selecting a control state that is executed by the electronic controller of the human-powered vehicle component of the illustrated embodiment.

The human-powered vehicle component 30 can be configured not to be managed by the second electric component 70. In this case, for example, the control process shown in FIG. 4 can be changed to the process shown in FIG. 6. The control process of FIG. 6 omits steps S14, S17, and S18 from FIG. 4. In a case in which the controller 34 determines in step S13 that time TA has not elapsed, the controller 34 proceeds to step S15. In a case in which the controller 34 determines in step S13 that time TA has elapsed, the controller 34 operates the third control state in step S19 and ends the process.

The procedures for switching the controller 34 of the human-powered vehicle component 30 to the second control state are not limited to the correspondence with the time TA and the second signal S2. For example, the controller 34 of the human-powered vehicle component 30 can obtain identification information of the second electric component 70 with the communication device 32. In this case, the controller 34 obtains the identification information of the second electric component 70, and the controller 34 operates in the second control state. In a case in which the controller 34 cannot obtain the identification information of the second electric component 70, the controller 34 operates in one of the first control state and the third control state.

The procedures for switching the first controller 54 of the first electric component 50 to the fifth control state are not limited to the correspondence with the time TB and the second signal S2. For example, the first controller 54 of the first electric component 50 can obtain identification information of the second electric component 70 with the communication device 32. In this case, the controller 34 obtains the identification information of the second electric component 70, and the controller 34 operates in the fifth control state. In a case in which the controller 34 cannot obtain the identification information of the second electric component 70, the controller 34 operates in one of the fourth control state and the sixth control state.

The procedures for switching the controller 34 of the human-powered vehicle component 30 to the third control state and the procedures for switching the first controller 54 of the first electric component 50 to the sixth control state are not limited to the correspondence with the times TA and TC and the signals SA and S1. For example, the memory 36 and the first memory 56 each store a priority rank related to the management of the components 30 and 50. In a case in which the priority rank stored in the memory 36 is higher than the priority rank of the first electric component 50, the controller 34 operates in the first control state. In a case in which the priority rank stored in the memory 36 is lower than the priority rank of the first electric component 50, the controller 34 operates in the third control state. In a case in which the priority rank stored in the first memory 56 is higher than the priority rank of the human-powered vehicle component 30, the first controller 54 operates in the fourth control state. In a case in which the priority rank stored in the memory 36 is lower than the priority rank of the first electric component 50, the first controller 54 operates in the sixth control state.

The second electric component 70 can be configured to manage charging of the human-powered vehicle component 30 and the first electric component 50. In this case, the human-powered vehicle 10 includes a connector configured to supply power from the external power supply 90 to the human-powered vehicle component 30 and the first electric component 50 in a state in which the human-powered vehicle component 30 and the first electric component 50 are connected to the second electric component 70. The connector is provided on at least one of the human-powered vehicle component 30, the first electric component 50, the second electric component 70, and the electric cable C. The second controller 78 manages charging and discharging of the human-powered vehicle component 30 that is in the second control state and the first electric component 50 that is in the fifth control state.

The second terminal 98B can be omitted from the external power supply 90. In this case, the human-powered vehicle component 30 and the first electric component 50 are charged by the power source 96 through power line communication of the third communication device 92.

The communication device 32 of the human-powered vehicle component 30, the first communication device 52 of the first electric component 50, and the second communication device 76 of the second electric component 70 can be connected by communication lines other than power lines and, for example, can communicate with each other through controller area network (CAN) or other communication methods.

The communication device 32 of the human-powered vehicle component 30, the first communication device 52 of the first electric component 50, and the second communication device 76 of the second electric component 70 can include a wireless communication device. In this case, the communication device 32 of the human-powered vehicle component 30, the first communication device 52 of the first electric component 50, and the second communication device 76 of the second electric component 70 perform wireless communication. Examples of standards of wireless communication performed by the wireless communication devices include ANT+® and Bluetooth®.

The human-powered vehicle component 30 can include at least one of a transmission that changes the transmission ratio of the human-powered vehicle 10, a drive unit, an operating device, a display device, an electric adjustable seatpost, and an electric suspension. Preferably, in a case in which the human-powered vehicle component 30 includes a drive unit, the drive unit is provided on a portion of the human-powered vehicle 10 differing from the second electric component 70.

The first electric component 50 can include at least one of a transmission that changes the transmission ratio of the human-powered vehicle 10, a drive unit, an operating device, a display device, an electric adjustable seatpost, and an electric suspension. Preferably, in a case in which the first electric component 50 includes a drive unit, the drive unit is provided on a portion of the human-powered vehicle 10 differing from the second electric component 70. The first electric component 50 can be a component that differs in type from the human-powered vehicle component 30. In a case in which multiple first electric components 50 are provided, the first electric components 50 can differ in type from each other.

The second electric component 70 can include at least one of a transmission that changes the transmission ratio of the human-powered vehicle 10, an operating device, a display device, an electric adjustable seatpost, and an electric suspension. The second electric component 70 can be an external device of the human-powered vehicle 10. Examples of external devices include a smartphone, a tablet-type computer, and a cycle computer. The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

What is claimed is:

1. A human-powered vehicle component comprising:
   a battery element;
   a communication device configured to communicate with a first electric component and a second electric component, the first electric component including a first battery element and the second electric component including a motor,
   a connector configured to be electrically connected to an external power supply; and
   an electronic controller configured to be operable in a first control state to manage at least one of charging and discharging of the battery element of the human-powered vehicle component and a second control state in which at least one of charging and discharging of the battery element of the human-powered vehicle component is managed by the second electric component, the charging and the discharging of the battery element of the human-powered vehicle component being managed based on a battery level and a capacity of the battery element,
   the electronic controller being configured to be operable in the first control state upon determining the communication device can communicate with the first electric component but cannot communicate with the second electric component,
   the electronic controller being configured to be operable in the second control state upon determining the communication device can communicate with the second electric component, and
   in the second control state, the second electric component being configured to manage charging of the battery element of the human-powered vehicle component from the external power supply upon the electronic controller determining the connector is electrically connected to the external power supply.

2. The human-powered vehicle component according to claim 1, wherein
   the second electric component is configured to be provided on a human-powered vehicle.

3. The human-powered vehicle component according to claim 1, wherein
   the human-powered vehicle component is a same type as the first electric component.

4. The human-powered vehicle component according to claim 1, wherein
   the electronic controller is configured to switch between the first control state and the second control state in accordance with a result of communication with the first electric component and the second electric component.

5. The human-powered vehicle component according to claim 4, wherein
   the electronic controller is configured to switch between the first control state and the second control state in accordance with a first signal being received by the communication device from the first electric component and a second signal being received by the communication device from the second electric component.

6. The human-powered vehicle component according to claim 5, further comprising
   a memory having inherent information stored therein, the electronic controller being configured to operate in the second control state upon determining the communication device continues to receive the second signal over a time corresponding to the inherent information.

7. The human-powered vehicle component according to claim 6, wherein
   the electronic controller is configured to operate in the first control state upon determining the communication device does not receive the second signal during the time corresponding to the inherent information and stops receiving the first signal during the time corresponding to the inherent information.

8. The human-powered vehicle component according to claim 5, wherein
   the first signal and the second signal each include an intermittent signal.

9. The human-powered vehicle component according to claim 1, wherein
   the communication device is configured to perform power line communication with the second electric component.

10. The human-powered vehicle component according to claim 1, wherein
    the motor of the second electric component assists in propulsion of a human-powered vehicle.

11. The human-powered vehicle component according to claim 1, wherein
    the electronic controller is configured to manage charging of the battery element of the human-powered vehicle component and the first battery element of the first electric component from the external power supply upon determining the connector is electrically connected to the external power supply in the first control state.

12. The human-powered vehicle component according to claim 1, wherein
    the communication device is configured to perform power line communication with the first electric component.

13. A human-powered vehicle component comprising:
    a battery element;
    a connector configured to be electrically connected to an external power supply;
    a communication device configured to communicate with a first electric component including a first battery element; and
    an electronic controller configured to be operable in a first control state to manage at least one of charging and discharging of the battery element of the human-powered vehicle component and a third control state in which at least one of charging and discharging of the battery element is managed by the first electric component, the charging and the discharging of the battery element of the human-powered vehicle component being managed based on a battery level and a capacity of the battery element,
    the electronic controller being configured to switch between the first control state and the third control state in accordance with a result of communication with the first electric component upon determining the communication device can communicate with the first electric component, and
    in the third control state, the first electric component being configured to manage charging of the battery element of the human-powered vehicle component from the external power supply upon the electronic controller determining the connector is electrically connected to the external power supply.

14. The human-powered vehicle component according to claim 13, wherein the electronic controller is configured to switch between the first control state and the third control state in accordance with a first signal being received by the communication device from the first electric component.

15. The human-powered vehicle component according to claim 14, further comprising a memory having inherent information stored therein, the electronic controller being configured to operate in the third control state upon determining the communication device continues to receive the first signal over a time corresponding to the inherent information.

16. The human-powered vehicle component according to claim 15, wherein the electronic controller is configured to operate in the first control state upon determining the communication device stops receiving the first signal during the time corresponding to the inherent information.

17. The human-powered vehicle component according to claim 13, further comprising a connector configured to be electrically connected to an external power supply, wherein:

the communication device is configured to communicate with a second electric component that includes a motor, the electronic controller is configured to be operable in a second control state in which at least one of charging and discharging of the battery element of the human-powered vehicle component is managed by the second electric component, the electronic controller is configured to be operable in the second control state upon determining the communication device can communicate with the second electric component, in the second control state, the second electric component being configured to manage charging of the battery element of the human-powered vehicle component from the external power supply upon the electronic controller determining the connector is electrically connected to the external power supply.

18. A human-powered vehicle component comprising:
a battery element;
a connector configured to be electrically connected to an external power supply; and
an electronic controller configured to be electrically connected to another human-powered vehicle component and an electric component, the another human-powered vehicle component including a first battery element and the elect& component including a motor, the electronic controller being configured to be operable in a first control state to manage the at least one of charging and discharging of the battery element of the human-powered vehicle component and a second control state in winch at least one of charging and discharging of the battery element of the human-powered vehicle component is managed by the electric component, the charging and the discharging of the battery element of the human-powered vehicle component being managed based on a battery level and a capacity of the battery element, the electronic controller being configured to be operable in the first control state upon determining the electronic controller is electrically connected to the another human-powered vehicle component but not electrically connected to the electric component, the electronic controller being configured to be operable in the second control state upon determining the electronic controller is electrically connected to the electric component, and in the second control state, the electric component being configured to manage charging of the battery element of the human-powered vehicle component from the external power supply upon the electronic controller determining the connector is electrically connected to the external power supply.

19. The human-powered vehicle component according to claim 18, wherein the motor of the electric component assists in propulsion of a human-powered vehicle.

20. The human-powered vehicle component according to claim 18, wherein the electronic controller is configured to manage charging of the battery element of the human-powered vehicle component and the first battery element of the another human-powered vehicle component from the external power supply upon determining the connector is electrically connected to the external power supply in the first control state.

* * * * *